US009615301B2

(12) United States Patent
Xia et al.

(10) Patent No.: US 9,615,301 B2
(45) Date of Patent: Apr. 4, 2017

(54) BASE STATION HANDOVER METHOD AND SYSTEM FOR COMMUNICATIONS SYSTEM

(71) Applicant: ZTE CORPORATION, Shenzhen, Guangdong (CN)

(72) Inventors: Yingying Xia, Shenzhen (CN); Yajun Zhao, Shenzhen (CN); Xuming Fang, Shenzhen (CN); Peng Geng, Shenzhen (CN); Hai Jiang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/439,337

(22) PCT Filed: Aug. 21, 2013

(86) PCT No.: PCT/CN2013/081957
§ 371 (c)(1),
(2) Date: Apr. 29, 2015

(87) PCT Pub. No.: WO2013/189400
PCT Pub. Date: Dec. 27, 2013

(65) Prior Publication Data
US 2015/0282035 A1 Oct. 1, 2015

(30) Foreign Application Priority Data
Oct. 29, 2012 (CN) .......................... 2012 1 0419496

(51) Int. Cl.
H04W 36/00 (2009.01)
H04W 36/30 (2009.01)
H04W 36/08 (2009.01)

(52) U.S. Cl.
CPC ....... H04W 36/30 (2013.01); H04W 36/0033 (2013.01); H04W 36/08 (2013.01)

(58) Field of Classification Search
CPC .. H04W 36/0033; H04W 36/08; H04W 36/30
(Continued)

(56) References Cited

U.S. PATENT DOCUMENTS 6,577,868 B1 6/2003 Vialen et al.
2004/0229617 A1* 11/2004 Sato ...................... H04W 36/18
455/437

(Continued)

FOREIGN PATENT DOCUMENTS

CN 101547485 A 9/2009
CN 102413520 A 4/2012
(Continued)

OTHER PUBLICATIONS

Extended European Search Report Dated Nov. 6, 2015, Application No. 13807380.4-1854 / 2914035 PCT/CN2013081957, Applicant ZTE Corporation, 7 Pages.
(Continued)

Primary Examiner — Rafael Pérez-Gutiérrez
Assistant Examiner — Mark G. Pannell
(74) Attorney, Agent, or Firm — Brooks Kushman P.C.

(57) ABSTRACT

A base station handover method and system for a communication system are provided. The method includes: a serving base station triggering a bi-casting operation according to information reported by a user equipment, adding a communication context of a target base station into a Mobile Management Entity (MME), and the MME notifying a Serving GateWay (SGW) to store two communication routes; the SGW communicating with the serving base station and the target base station after the triggering of bi-casting is completed; and the serving base station interacting with the user equipment, and handing over the user equipment from the serving base station to the target base station. By means of the technical scheme according to the embodiments of the present document, the complexity of base station handover can be reduced, the efficiency of base station handover can be increased, and at the same time the practicability is enhanced.

16 Claims, 4 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 2012/0051349 | A1* | 3/2012 | Teyeb ................... | H04W 36/02 370/338 |
| 2013/0195005 | A1* | 8/2013 | Al-Shalash ........... | H04W 36/16 370/315 |
| 2013/0215772 | A1* | 8/2013 | Kaur ................. | H04W 36/0072 370/252 |
| 2013/0258890 | A1* | 10/2013 | Li ......................... | H04W 24/02 370/252 |
| 2014/0098779 | A1* | 4/2014 | Kim ...................... | H04B 7/024 370/329 |

FOREIGN PATENT DOCUMENTS

| | | | |
|---|---|---|---|
| WO | 2011066853 | A1 | 6/2011 |
| WO | 2011160120 | A1 | 12/2011 |

OTHER PUBLICATIONS

PCT International Search Report Dated Nov. 28, 2013, Application No. PCT/CN2013/081957, 3 Pages.

* cited by examiner

BASE STATION HANDOVER METHOD AND SYSTEM FOR COMMUNICATIONS SYSTEM

CROSS-REFERENCE TO RELATED APPLICATIONS

This application is a U.S. national phase of PCT Application No. PCT/CN2013/081957 filed Aug. 21, 2013, which claims priority to Chinese Application No. 201210419496.7 filed Oct. 29, 2012, the disclosures of which are incorporated in their entirety by reference herein.

TECHNICAL FIELD

The present document relates to the field of mobile communications, and in particular, to a base station handover method and system for a communication system.

BACKGROUND

At present, due to continuous increase of the speed of the high speed rail, a large challenge is brought to the performance of base station handover of the existing vehicle-ground communication system. First of all, Doppler frequency offset and channel fast fading due to high speed movement bring a large threat to the high speed data transmission. The channel will present fast time-varying characteristics, which is particularly obvious in a Time Division Duplexing (TDD for short) system, and may possibly results in a base station being difficult to demodulate a received signal. At the same time, in a handover area, a train will receive signals from two adjacent base stations, which have close energy and Doppler frequency offsets of which one is two times larger than the other, and the signals have a positive and negative frequency offset jump characteristic. Secondly, the increase of the speed will results in a problem of frequent handover, which raises higher demands on the system mobility management (particularly fast handover control). Finally, as the geographical positions of passengers on the train are relatively centralized, when the train passes across a cell edge, cluster handover will occur. This is a problem which is rarely faced in the traditional communication system.

In a wireless communication network, the base station handover is primarily divided into two kinds, i.e., hard handover and soft handover. In a Long Term Evolution (LTE for short) network, on one hand, as a Radio Network Controller (RNC for short) node in the 3G network is cancelled, the handover is processed by the base station (eNB), and the network loses a centralized control capability; and on the other hand, the LTE is an Orthogonal Frequency Division Multiplexing (OFDM for short) system and uses co-frequency networking, this results in a User Equipment (UE for short) in the LTE system not being able to receive signals of two adjacent cells at the same time on the same frequency like the UE in the 3G system. Therefore, the LTE can only use a manner of hard handover. Due to the characteristics of "break-before-make" for the hard handover, interruption necessarily occurs in the handover process, which has a serious effect on the handover performance.

In the related art, Coordinated multi-point (CoMP for short) refers to a technology that multiple transmission points separated geographically participate in coordination in transmitting data to a terminal or in coordination in receiving data transmitted by a terminal. According to different transmission schemes, the CoMP is divided into two types, i.e., joint processing and coordinated scheduling/beam-forming. The joint processing is further divided into two types, i.e., Joint Transmission (JT) and dynamic cell selection, wherein, the primary principle of the CoMP-JT technology is that multiple cell base stations participating in coordination transmit the same data to a terminal at the same time on the same time-frequency resources through a Physical Downlink Shared Channel (PDSCH for short), so as to convert inter-cell interference signals in the conventional LTE network into useful signals, thereby achieving the purpose of reducing the interference and increasing the reception power, and effectively obtaining joint processing gain and diversity gain. The CoMP was originally proposed to solve the interference to users at the cell edge, so as to increase the throughput of the users at the edge. However, it can be seen from the principle of the CoMP-JT that it can fundamentally solve the problem of LTE hard handover, thereby achieving a basic requirement of constituting soft handover, and thus improving the handover performance.

In addition to the handover success rate, the handover delay is also an important index to be considered in the handover process. In the conventional LTE handover process, a "data forwarding" mechanism of a Universal Mobile Telecommunication system (UMTS for short) continues to be used, and in this process, there is a degree of eNB processing delay and X2 transmission delay. LTE is an IP-based transmission network, which may achieve data sharing between a serving base station and a target base station using the existing "bi-casting" technology in the IP network, that is, a Service GateWay (SGW for short) transmits the received original data to the serving base station and the target base station to be handed over on two paths without any change. In handover process, there is a short interruption time for the "bi-casting". However, if the conventional "bi-casting" mechanism is directly introduced into the LTE handover, a problem that lossless data transmission cannot be ensured may occur. When the "bi-casting" starts, a condition that the serving eNB cannot correctly transmit a packet to the UE may possibly already occur, and if the target eNB directly forwards a data package from the SGW after the UE successfully accesses, theses lost packets may be beyond retrieval. At the same time, if the "bi-casting" manner is used, the complexity of the system will increase to some extent.

SUMMARY

The present document provides a base station handover method and system for a communication system, to reduce the complexity of the base station handover, increase the efficiency of the base station handover, and enhance the practicability at the same time.

The embodiments of the present document provide a base station handover method for a communication system, comprising: a serving base station triggering a bi-casting operation according to information reported by a user equipment, and adding a communication context of a target base station into a Mobility Management Entity (MME), and the MME notifying a Serving GateWay (SGW) to store two communication routes; the SGW communicating with the serving base station and the target base station after the triggering of bi-casting is completed; and the serving base station interacting with the user equipment, to hand over the user equipment from the serving base station to the target base station.

Preferably, after the SGW communicates with the serving base station and the target base station after the triggering of bi-casting is completed, the method further comprises: in the downlink, after the serving base station and the target base station receive data transmitted by the SGW through bi-casting, both or one of the serving base station and the target base station transmitting the data to the user equipment; and in the uplink, both or one of the serving base station and the target base station receiving the data transmitted by the user equipment.

Preferably, the method further comprises: when the user equipment determines that it needs to perform base station handover, handing over the user equipment from the serving base station to the target base station by updating context information of the user equipment; and after the handover is completed, releasing the bi-casting operation.

Preferably, the method further comprises: before the bi-casting operation is triggered, the serving base station triggering a CoMP operation, and adding context information of the user equipment to the target base station through an interface between the base stations, and the target base station requesting the MME to update a coordinated set, and adding context information of the target base station to the MME; after the triggering of CoMP is completed, in the downlink, after receiving data transmitted by the SGW through bi-casting, the serving base station and the target base station transmitting the data to the user equipment on the same time-frequency resources through CoMP; and/or in the uplink, the serving base station and the target base station receiving the data of the user equipment in coordination; and after the handover is completed and before the bi-casting operation is released, releasing the CoMP operation.

Preferably, the CoMP operation is a CoMP-Joint Transmission (JT) operation.

Preferably, triggering a bi-casting operation comprises: the user equipment performing physical layer measurements in real time, and reporting a measurement result to a Radio Resource Control protocol (RRC) layer of the serving base station; and the RRC layer of the serving base station analyzing the measurement result, and if a difference between signal quality of the target base station and signal quality of the serving base station is larger than a preset first threshold, triggering bi-casting to the SGW.

Preferably, triggering the CoMP operation and the bi-casting operation comprises: the user equipment performing physical layer measurements in real time, and reporting a measurement result to a RRC layer of the serving base station; the RRC layer of the serving base station analyzing the measurement result, and if a difference between signal quality of the target base station and signal quality of the serving base station is larger than a preset first threshold, initiating a CoMP-JT request to the target base station; the target base station reserving corresponding resources and storing corresponding context information of the user equipment, and transmitting to the MME a CoMP-JT coordinated set update request to request for triggering the CoMP-JT operation, wherein, the context information of the user equipment stored by the target base station is communication context information from the user equipment to the target base station; the MME storing corresponding two sets of context information of the user equipment, and triggering bi-casting to the SGW, wherein, the two sets of context information of the user equipment stored by the MME are communication context information from the user equipment to the target base station and communication context information from the user equipment to the serving base station; and the SGW storing corresponding two sets of context information of the user equipment, wherein, the two sets of context information of the user equipment stored by the SGW comprise communication route information from the SGW to the target base station and communication route information from the SGW to the serving base station.

Preferably, after receiving data transmitted by the SGW through bi-casting, the serving base station and the target base station transmitting the data to the user equipment on the same time-frequency resources through CoMP-JT comprises:

the SGW performing bi-casting through interfaces between the base stations and the MME/SGW, and transmitting the same data to the serving base station and the target base station at the same time; and the serving base station and the target base station buffering the data respectively, interacting signaling messages necessarily required for the CoMP-JT operation on an interface between the base stations, and after the CoMP-JT process is performed on the data according to the signaling message, transmitting the data to the user equipment on the same time-frequency resources through CoMP-JT.

Preferably, after the serving base station and the target base station buffer the data respectively, the method further comprises: the serving base station and the target base station interacting information through the interface between the base stations, selecting a received signal of a base station with better quality as a reception signal, and discarding a signal of a base station with worse quality.

Preferably, handing over the user equipment from the serving base station to the target base station comprises: the RRC layer of the serving base station analyzing a measurement result reported by the user equipment, and if a difference between signal quality of the target base station and signal quality of the serving base station is larger than a preset second threshold, determining to perform base station handover, wherein, the second threshold is larger than the first threshold;

the serving base station transmitting a handover request to the target base station;

the target base station updating the context information of the user equipment according to the handover request;

the serving base station transmitting RRC link reconfiguration information to the user equipment; and the user equipment transmitting RRC link reconfiguration complete information to the target base station, to complete handover from the serving base station to the target base station.

Preferably, after the handover is completed and before the bi-casting operation is released, releasing the CoMP operation comprises:

a RRC layer of a new serving base station (the original target base station) of the user equipment analyzing a measurement result reported by the user equipment, and when it is determined that the signal quality of the original serving base station is lower than a preset third threshold, transmitting to the MME a CoMP-JT coordinated set update request to request for releasing the CoMP-JT operation, and transmitting a CoMP-JT coordination exit request to the original serving base station;

the original serving base station deleting the communication context information from the user equipment to the original serving base station, and transmitting a response to the CoMP-JT coordination exit request to the new serving base station; the MME exiting the CoMP-JT operation, only storing the communication context information from the user equipment to the new serving base station, and transmitting a bi-casting exit request to the SGW; and the SGW exiting the bi-casting operation, only storing the communication route information from the SGW to the new serving base station, and transmitting a response to the bi-casting exit request to the MME.

The embodiments of the present document further provide a base station handover system for a communication system, comprising: a user equipment, a serving base station, a target base station, a Mobility Management Entity (MME), and a Serving GateWay (SGW), wherein, the serving base station is configured to trigger a bi-casting operation according to information reported by the user equipment, add a communication context of the target base station into the MME, and interact with the user equipment to hand over the user equipment from the serving base station to the target base station; the MME is configured to notify the SGW to store two communication routes; and the SGW is configured to communicate with the serving base station and the target base station after the triggering of bi-casting is completed.

Preferably, the SGW is configured to transmit the same data to the serving base station and the target base station in the downlink; and the serving base station and the target base station are configured to transmit data transmitted by the SGW through bi-casting to the user equipment after receiving the data, and receive the data transmitted by the user equipment in the uplink.

Preferably, the serving base station is configured to hand over the user equipment from the serving base station to the target base station by updating context information of the user equipment when the user equipment determines that it needs to perform base station handover, and release the bi-casting operation after the handover is completed.

Preferably, the serving base station is configured to before the bi-casting operation is triggered, trigger a CoMP operation, and add context information of the user equipment to the target base station through an interface between the base stations; after the triggering of CoMP is completed, in the downlink, after receiving data transmitted by the SGW through bi-casting, transmit the data to the user equipment on the same time-frequency resources through CoMP together with the target base station; and after the handover is completed and before the bi-casting operation is released, complete releasing the CoMP operation in coordination; the target base station is configured to request to update a coordinated set from the MME, and add context information of the target base station to the MME; after the triggering of CoMP is completed, in the downlink, after receiving data transmitted by the SGW through bi-casting, transmit the data to the user equipment on the same time-frequency resources through CoMP together with the serving base station; and after the handover is completed and before the bi-casting operation is released, complete releasing the CoMP operation in coordination; the user equipment is configured to transmit the same information to the serving base station and the target base station respectively through CoMP at the same time; the MME is configured to after the handover is completed and before the bi-casting operation is released, complete releasing the CoMP operation in coordination; and the SGW is configured to after the handover is completed and before the bi-casting operation is released, release the CoMP operation in coordination.

Preferably, the CoMP operation is a CoMP-Joint Transmission (JT) operation.

Preferably, the user equipment is configured to measure a physical layer in real time, and report a measurement result to a Radio Resource Control protocol (RRC) layer of the serving base station; and the serving base station is configured to analyze the measurement result, and if a difference between signal quality of the target base station and signal quality of the serving base station is larger than a preset first threshold, trigger bi-casting to the SGW.

Preferably, the user equipment is configured to measure a physical layer in real time, and report a measurement result to the serving base station; the serving base station is configured to analyze the measurement result, and if a difference between signal quality of the target base station and signal quality of the serving base station is larger than a preset first threshold, initiate a CoMP-JT request to the target base station; the target base station is configured to reserve corresponding resources and store corresponding context information of the user equipment, and transmit to the MME a CoMP-JT coordinated set update request to request for triggering the CoMP-JT operation, wherein, the context information of the user equipment stored by the target base station is communication context information from the user equipment to the target base station; the MME is configured to store corresponding two sets of context information of the user equipment, and trigger bi-casting to the SGW, wherein, the two sets of context information of the user equipment stored by the MME is communication context information from the user equipment to the target base station and communication context information from the user equipment to the serving base station; and the SGW is configured to store corresponding two sets of context information of the user equipment, wherein, the two sets of context information of the user equipment stored by the SGW comprises communication route information from the SGW to the target base station and communication route information from the SGW to the serving base station.

Preferably, the SGW is configured to perform bi-casting through interfaces between the base stations and the MME/SGW, and transmit the same data to the serving base station and the target base station at the same time; and the serving base station and the target base station are configured to buffer the data respectively, interact signaling messages necessarily required for the CoMP-JT operation on an interface between the base stations, and after the CoMP-JT operation is performed on the data according to the signaling message, transmit the data to the user equipment on the same time-frequency resources through the CoMP-JT.

Preferably, the serving base station and the target base station are configured to after buffering the data, interact information through the interface between the base stations, select a received signal of a base station with better quality as a reception signal, and discard a signal of a base station with worse quality.

Preferably, the serving base station is configured to analyze a measurement result reported by the user equipment, and if a difference between signal quality of the target base station and signal quality of the serving base station is larger than a preset second threshold, determine to perform base station handover, transmit a handover request to the target base station, and transmit RRC link reconfiguration information to the user equipment, wherein, the second threshold is larger than the first threshold; the target base station is configured to update the context information of the user equipment according to the handover request; and the user equipment is configured to transmit RRC link reconfiguration complete information to the target base station, to complete handover from the serving base station to the target base station.

Preferably, a new serving base station of the user equipment is configured to analyze a measurement result reported by the user equipment, and when it is determined that the signal quality of the original serving base station is lower than a preset third threshold, transmit to the MME a CoMP- JT coordinated set update request to request for releasing the CoMP-JT operation, and transmit a CoMP-JT coordination exit request to the original serving base station; the original serving base station is configured to delete the communication context information from the user equipment to the original serving base station, and transmit a response to the CoMP-JT coordination exit request to the new serving base station; the MME is configured to exit the CoMP-JT operation, only store the communication context information from the user equipment to the new serving base station, and transmit a bi-casting exit request to the SGW; and the SGW is configured to exit the bi-casting operation, only store the communication route information from the SGW to the new serving base station, and transmit a response to the bi-casting exit request to the MME.

The embodiments of the present document have the following beneficial effects:

The CoMP-JT operation and the bi-casting operation are triggered before the base station handover, the UE is kept in connection with both the serving base station and the target base station at the same time using the CoMP-JT technology, data are transmitted by the SGW to the serving base station and the target base station at the same time using the bi-casting technology, and during the base station handover, the handover process is converted into the serving cell update process, which can reduce the complexity of the base station handover, increase the efficiency of the base station handover, and at the same time enhance practicability.

The above description is merely overview of the technical scheme of the present document. In order to better understand the technical means of the present document, the present document can be practiced according to the content of the specification. In addition, in order to make the above and other purposes, features and advantages of the present document more obvious and understandable, the specific implementations of the present document are given by way of example below.

BRIEF DESCRIPTION OF DRAWINGS

Through reading the detailed description of the following preferable implementations, various other advantages and benefits will become clear and obvious for an ordinary skilled in the art. The accompanying drawings are merely used for the purpose of illustrating preferable implementations without limiting the present document. Throughout the accompanying drawings, the same reference signs are used to represent the same components. In the accompanying drawings.

PREFERRED EMBODIMENTS OF THE PRESENT DOCUMENT

Example embodiments of the present disclosure will be described in detail below with reference to accompanying drawings. Although the accompanying drawings illustrate the example embodiments of the present disclosure, it should be understood that the present disclosure may be implemented in various manners without being limited to the embodiments described herein. In contrary, these embodiments are provided to more thoroughly understand the present disclosure, and can completely convey the scope of the present disclosure to those skilled in the art.

In order to reduce the complexity of the base station handover and improve the efficiency of base station handover while enhancing practicability, the present document provides a base station handover method and system for a communication system. The embodiments of the present document combine the CoMP-JT technology and the bi-casting technology, which can not only well overcome the shortage of the "bi-casting" technology, but also can well utilize the advantage of the CoMP-JT in terms of soft handover, to achieve the effect of reducing the handover delay.

Figure 1:
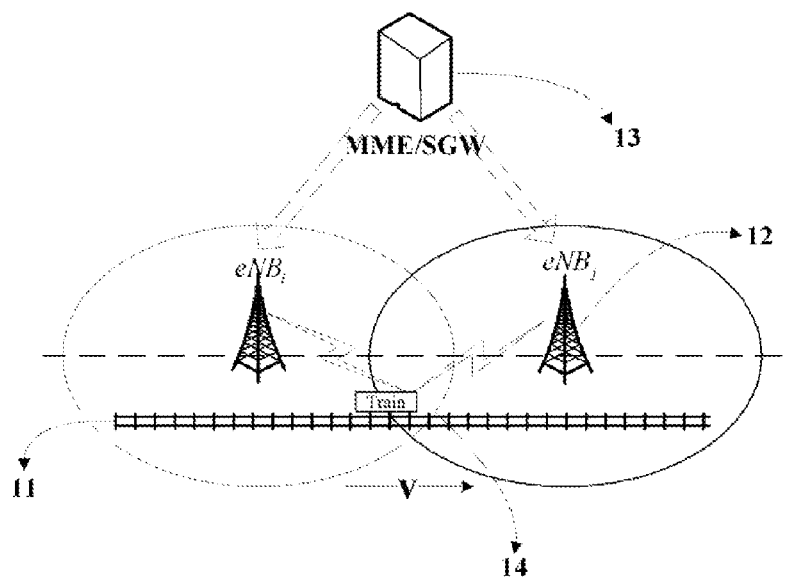
FIG. 1 is a diagram of system network architecture according to an embodiment of the present document.

The technical scheme of the embodiments of the present document is based on LTE network system architecture, is comprised of an Evolved NodeB (eNB), a Mobility Management Entity (MME), a Serving GateWay (SGW), a user equipment, and corresponding interfaces, and is applicable to a railway environment (for example, ordinary railway, high-speed railway, city light rail, and subway) or a band wireless communication topology environment (for example, highway). FIG. 1 is a diagram of system network architecture according to an embodiment of the present document. As shown in FIG. 1, the system network architecture comprises a track 11, an eNB 12, an MME/SGW 13, and a user equipment 14. Wherein, the eNB 12 is arranged along a railway line of the track 11. In the embodiments of the present document, the base station is not limited to the eNB, and can uses base station architecture in multiple CoMP-JT standard scenarios, especially "BBU+RRU" architecture. The MME and the SGW may or may not be located at the same station location. The user equipment 14 is located on a train, and has a frequency offset correction capability. For example, the user equipment 14 may be a vehicle-mounted platform or a vehicle-mounted relay.

In the embodiments of the present document, the whole access network part of the communication system is divided into two parts, i.e., in-vehicle communication and vehicle-ground communication. FIG. 1 is a vehicle-ground communication part, which is comprised of a user equipment and a roadside base station. The in-vehicle communication part may install a wireless access device such as a pico-base station or WiFi etc. in each compartment, and the user information converges to the user equipment by the processing of the device. In addition, the constitution of the network further comprises corresponding interfaces among various network entities, such as an X2 interface and an S1 interface.

The technical scheme of the embodiments of the present document primarily keeps the UE to be connected to the serving eNB and the target eNB at the same time through an air interface using the CoMP-JT technology, to achieve the effect of soft handover while obtaining a diversity gain; and enables the SGW to transmit data to the serving eNB and the target eNB at the same time through the S1 interface using the bi-casting technology, to avoid the data forwarding delay of the X2 interface in the handover process and data sharing delay of the X2 interface during the CoMP-JT process, thereby reducing the handover delay.

Compared with the conventional base station handover method, the technical scheme of the embodiments of the present document primarily differs in that joining and exiting procedures of CoMP-JP and bi-casting are newly added before and after the handover, and both of them are bound so as to achieve triggering and exiting of them at the same time with only a set of signaling. In this way, not only the shortage of the bi-casting technology per se can be well overcome, but also the advantage of CoMP-JT in terms of soft handover can be utilized, to achieve the effect of reducing the handover delay. At the same time, as the information required for handover has been stored in various network element entities in the CoMP-JT and bi-casting triggering process, this largely simplifies the subsequent handover signaling procedure.

The present document will be further described in detail below in conjunction with accompanying drawings and embodiments. It should be understood that the specific embodiments described here are only used to explain the present document without limitation.

Method Embodiments

Figure 2:
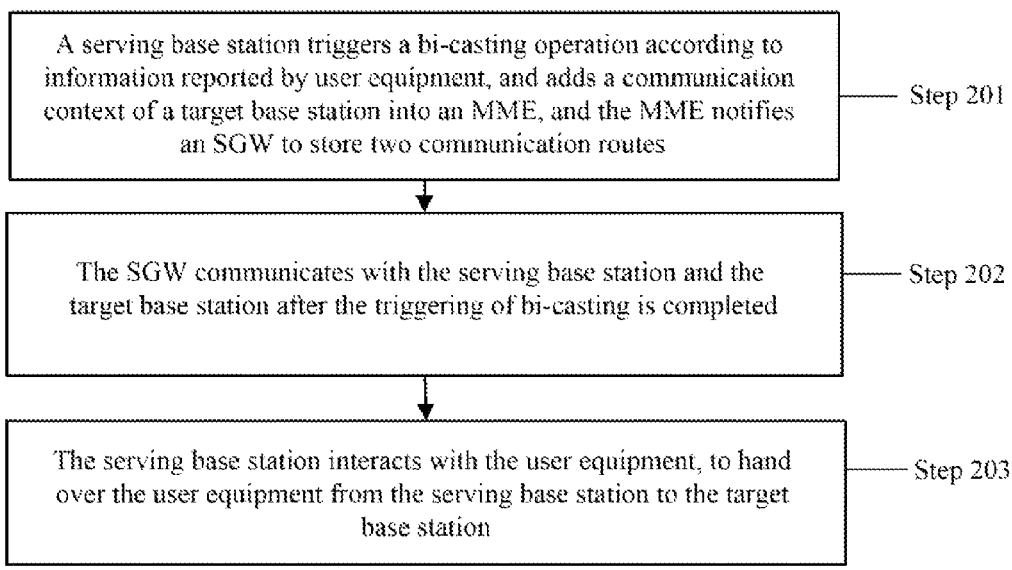
FIG. 2 is a flowchart of a base station handover method for a communication system according to an embodiment of the present document.

According to the embodiment of the present document, a base station handover method for a communication system is provided. Based on the LTE network system architecture, FIG. 2 is a flowchart of a base station handover method for a communication system according to an embodiment of the present document. As shown in FIG. 1, the base station handover method for a communication system according to an embodiment of the present document comprises the following processes.

In step 201, a serving base station triggers a bi-casting operation according to information reported by user equipment, and adds a communication context of a target base station into an MME, and the MME notifies an SGW to store two communication routes.

In step 201, triggering a bi-casting operation specifically comprises: the user equipment performing physical layer measurements in real time, and reporting a measurement result to a RRC layer of the serving base station; and the RRC layer of the serving base station analyzing the measurement result, and if a difference between signal quality of the target base station and signal quality of the serving base station is larger than a preset first threshold, triggering bi-casting to the SGW.

In step 202, the SGW communicates with the serving base station and the target base station after the triggering of bi-casting is completed.

It should be illustrated that in the embodiment of the present document, the SGW may communicate with the serving base station and the target base station at the same time. That is, the SGW has a capability of communicating with the serving base station and the target base station at the same time. However, in practical applications, the SGW may also not communicate with the serving base station and the target base station at the same time.

In step 202, after the SGW communicates with the serving base station and the target base station after the triggering of bi-casting is completed, in the downlink, after the serving base station and the target base station receive data transmitted by the SGW through bi-casting, both or one of the serving base station and the target base station transmit the data to the user equipment; and in the uplink, both or one of the serving base station and the target base station receive the data transmitted by the user equipment.

In step 203, the serving base station interacts with the user equipment, to hand over the user equipment from the serving base station to the target base station.

In step 203, when it is determined that it needs to perform base station handover, the user equipment is handed over from the serving base station to the target base station by updating context information of the user equipment; and after the handover is completed, the bi-casting operation is released.

Preferably, in the embodiment of the present document, before the bi-casting operation is triggered, the serving base station triggers a CoMP operation, and adds context information of the user equipment to the target base station through an interface between the base stations, and the target base station requests the MME to update a coordinated set, and adds context information of the target base station to the MME.

After the triggering of CoMP is completed, in the downlink, the serving base station and the target base station transmit the data to the user equipment on the same time-frequency resource through CoMP after receiving data transmitted by the SGW through bi-casting; and/or in the uplink, the serving base station and the target base station receive the data of the user equipment in coordination; and after the handover is completed and before the bi-casting operation is released, the CoMP operation is released. Wherein, the CoMP operation is a CoMP-Joint Transmission (JT) operation.

Specifically, the serving base station and the target base station transmitting the data to the user equipment on the same time-frequency resource through CoMP-JT after receiving data transmitted by the SGW through bi-casting specifically comprises: 1, the SGW performing bi-casting through interfaces between the base stations and the MME/SGW, and transmitting the same data to the serving base station and the target base station at the same time; and 2, the serving base station and the target base station buffering the data respectively, interacting signaling messages necessarily required for the CoMP-JT operation on an interface between the base stations, and after the CoMP-JT process is performed on the data according to the signaling message, transmitting the data to the user equipment on the same time-frequency resource through the CoMP-JT.

Wherein, after the serving base station and the target base station buffer the data respectively, the serving base station and the target base station interact information through the interface between the base stations, select a received signal of a base station with better quality as a reception signal, and discard a signal of a base station with worse quality.

Specifically, triggering the CoMP operation and the bi-casting operation comprises:

1. the user equipment performing physical layer measurements in real time, and reporting a measurement result to a RRC layer of the serving base station;

2. the RRC layer of the serving base station analyzing the measurement result, and if a difference between signal quality of the target base station and signal quality of the serving base station is larger than a preset first threshold, initiating a CoMP-JT request to the target base station;

3. the target base station reserving corresponding resources and storing corresponding context information of the user equipment, and transmitting to the MME a CoMP-JT coordinated set update request to request for triggering the CoMP-JT operation, wherein, the context information of the user equipment stored by the target base station is communication context information from the user equipment to the target base station;

4. the MME storing corresponding two sets of context information of the user equipment, and triggering bi-casting to the SGW, wherein, the two set of context information of the user equipment stored by the MME is communication context information from the user equipment to the target base station and communication context information from the user equipment to the serving base station; and 5. the SGW storing corresponding two sets of context information of the user equipment, wherein, the two sets of context information of the user equipment stored by the SGW comprises communication route information from the SGW to the target base station and communication route information from the SGW to the serving base station.

Specifically, handing over the user equipment from the serving base station to the target base station specifically comprises:

1. the RRC layer of the serving base station analyzing a measurement result reported by the user equipment, and if a difference between signal quality of the target base station and signal quality of the serving base station is larger than a preset second threshold, determining to perform base station handover, wherein, the second threshold is larger than the first threshold;

2. the serving base station transmitting a handover request to the target base station;

3. the target base station updating the context information of the user equipment according to the handover request;

4. the serving base station transmitting RRC link reconfiguration information to the user equipment; and 5. the user equipment transmitting RRC link reconfiguration complete information to the target base station, to complete handover from the serving base station to the target base station.

In the embodiment of the present document, after the handover is completed and before the bi-casting operation is released, releasing the CoMP operation specifically comprises:

1. a RRC layer of a new serving base station (original target base station) of the user equipment analyzing a measurement result reported by the user equipment, and when it is determined that the signal quality of the original serving base station is lower than a preset third threshold, transmitting to the MME a CoMP-JT coordinated set update request to request for releasing the CoMP-JT operation, and transmitting a CoMP-JT coordination exit request to the original serving base station;

2. the original serving base station deleting the communication context information from the user equipment to the original serving base station, and transmitting a response to the CoMP-JT coordination exit request to the new serving base station;

3. the MME exiting the CoMP-JT operation, only storing the communication context information from the user equipment to the new serving base station, and transmitting a bi-casting exit request to the SGW; and 4. the SGW exiting the bi-casting operation, only storing the communication route information from the SGW to the new serving base station, and transmitting a response to the bi-casting exit request to the MME.

The above technical scheme of the embodiments of the present document will be described in detail below by taking triggering the CoMP-JT operation and the bi-casting operation at the same time as an example.

In step 1, before it is determined that it needs to perform base station handover, the CoMP-JT operation and the bi-casting operation are triggered. In the downlink, the serving base station and the target base station transmit the data to the user equipment on the same time-frequency resource through CoMP-JT after receiving the data transmitted by the SGW through bi-casting, and the user equipment combines the received data. In the uplink, the serving base station and the target base station receive the signal transmitted by the user equipment at the same time, and perform selective combining by information interaction.

Specifically, in step 1, triggering the CoMP-JT operation and the bi-casting operation specifically comprises the following processes.

In step 11, the user equipment performs physical layer measurement in real time, and reports a measurement result to a Radio Resource Control (RRC for short) layer of the serving base station.

In step 12, the RRC layer of the serving base station analyzes the measurement result, and if a difference between signal quality of the target base station and signal quality of the serving base station is larger than a preset first threshold, initiates a CoMP-JT request to the target base station.

In step 13, the target base station reserves corresponding resources and stores corresponding context information of the user equipment, and transmits to the MME a CoMP-JT coordinated set update request to request for triggering the CoMP-JT operation, wherein, the context information of the user equipment stored by the target base station is communication context information from the user equipment to the target base station.

In step 14, the MME stores corresponding two sets of context information of the user equipment, and triggers bi-casting to the SGW, wherein, the two sets of context information of the user equipment stored by the MME is communication context information from the user equipment to the target base station and communication context information from the user equipment to the serving base station.

In step 15, the SGW stores corresponding two sets of context information of the user equipment, wherein, the two sets of context information of the user equipment stored by the SGW comprises communication route information from the SGW to the target base station and communication route information from the SGW to the serving base station.

In step 1, the SGW may perform bi-casting through interfaces (for example, the S1 interface) between the base stations and the MME/SGW to transmit the same data to the serving base station and the target base station at the same time. The serving base station and the target base station buffer the data respectively, may interact signaling messages necessarily required for the CoMP-JT operation on an interface (for example, the X2 interface) between base stations, and after the CoMP-JT process is performed on the data according to the signaling message, transmit the data to the user equipment on the same time-frequency resources through CoMP-JT.

In step 1, in the uplink, after receiving the data transmitted by the user equipment at the same time, the serving base station and the target base station may interact information through the interface (for example, the X2 interface) between base stations, select a received signal of a base station with better quality as a reception signal, and discard a signal of a base station with worse quality.

In step 2, when the user equipment determines that it needs to perform base station handover, the user equipment hands over the vehicle-mounted base station from the serving base station to the target base station by updating the context information of the user equipment.

Specifically, step 2 comprises the following processes.

In step 21, the RRC layer of the serving base station analyzes a measurement result reported by the user equipment, and if a difference between signal quality of the target base station and signal quality of the serving base station is larger than a preset second threshold, determines to perform base station handover, wherein, the second threshold is larger than the first threshold.

In step 22, the serving base station transmits a handover request to the target base station.

In step 23, the target base station updates the context information of the user equipment according to the handover request.

In step 24, the serving base station transmits RRC link reconfiguration information to the user equipment.

In step 25, the user equipment transmits RRC link reconfiguration complete information to the target base station, to complete handover from the serving base station to the target base station.

In step 3, after the handover is completed, the bi-casting operation and the bi-casting operation are released as needed.

Specifically, step 3 comprises the following processes.

In step 31, a RRC layer of a new serving base station analyzes a measurement result reported by the user equipment, and when it is determined that the signal quality of the original serving base station is lower than a preset third threshold, transmits to the MME a CoMP-JT coordinated set update request to request for releasing the CoMP-JT operation, and transmits a CoMP-JT coordination exit request to the original serving base station.

In step 32, the original serving base station deletes the communication context information from the user equipment to the original serving base station, and transmits a response to the CoMP-JT coordination exit request to the new serving base station.

In step 33, the MME exits the CoMP-JT operation, stores only the communication context information from the user equipment to the new serving base station, and transmits a bi-casting exit request to the SGW.

In step 34, the SGW exits the bi-casting operation, stores only the communication route information from the SGW to the new serving base station, and transmits a response to the bi-casting exit request to the MME.

It should be illustrated that, the embodiment of the present document is applicable to band wireless communication topology environment, and is also applicable to multiple CoMP-JT standard scenarios. That is, the embodiment of the present document allows CoMP-JT and bi-casting to be used independently at the same time.

The above technical scheme of the embodiments of the present document will be described in detail below in conjunction with accompanying drawings.

Based on the system network architecture illustrated in FIG. 1, the CoMP-JT and bi-casting technologies are used in the embodiments of the present document to improve the handover performance, which specifically comprises the following processes.

First: seamless handover is achieved on the air interface using CoMP-JT. Specifically, 1. With respect to the downlink, the serving eNB and the target eNB transmit the same data to the user equipment on the same time-frequency resource, and the user equipment combines the received signals to achieve the diversity effect, thereby improving the quality of the received signal. With respect to the uplink, the serving eNB and the target eNB receive the signal transmitted by the user equipment at the same time, and perform selective combining by information interaction through the X2 interface (i.e., selecting a received eNB signal with better quality as a reception signal, and discard an eNB reception signal with poor quality).

2. The train keeps communication with the serving eNB and the target eNB at the same time, and there is no "break-before-make" process in the handover process, to achieve an effect of soft handover.

3. The air interface handover process is converted into a serving cell update process, which is achieved by changing communication context information in various network element entities. Wherein, after the target eNB receives a "handover request" message and accepts the handover, the target eNB updates communication context information which is stored locally; after receiving a "handover reply" from the target eNB, the serving eNB updates the communication context information stored locally; the user equipment changes the communication context information stored locally by receiving "RRC link reconfiguration" signaling transmitted by the serving eNB; and the change of the communication context information stored in the MME/SGW is completed after exiting the coordination and bi-casting.

4. The information necessarily required for the CoMP-JT process is interacted through the X2 interface. Wherein, the necessary information required for the CoMP-JT process includes data synchronization information, precoding information, CSI feedback, scheduling information etc.

Second: handover delay is reduced on the S1 interface through bi-casting. Specifically, 1. With respect to the downlink, the SGW transmits the same data to two eNBs at the same time, thereby reducing interruption time generated by "data forwarding" in the LTE handover. With respect to the uplink, bi-casting of data is not performed at the same time, but the serving eNB and the target eNB perform selective combining and transmission of a single path using a bi-casting link.

2. Corresponding soft upgrade processing is performed on the MME, so that after the MME receives a "CoMP-JT coordinated set update" message from the eNB, the MME can directly trigger bi-casting to the SGW, and obtain two communication routes by using communication context information of the serving eNB and the target eNB in the "CoMP-JT coordinated set update" message.

3. The triggering and exiting of CoMP-JT and bi-casting occur at the same time, without adding extra complexity of the system.

Figure 3:
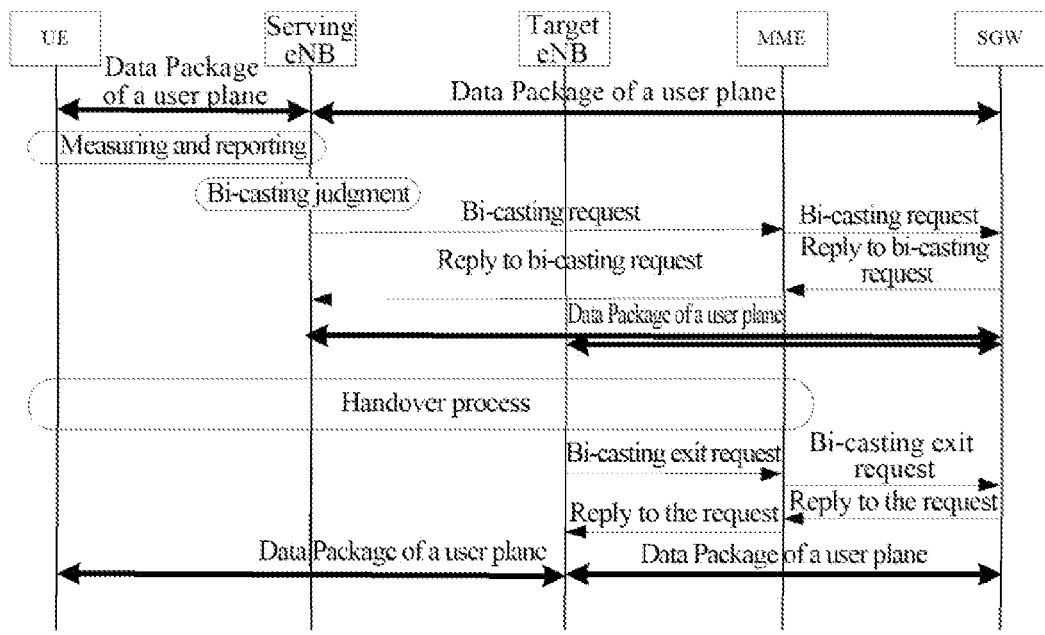
FIG. 3 is a signaling flowchart of triggering and exiting bi-casting according to an embodiment of the present document.
Figure 4:
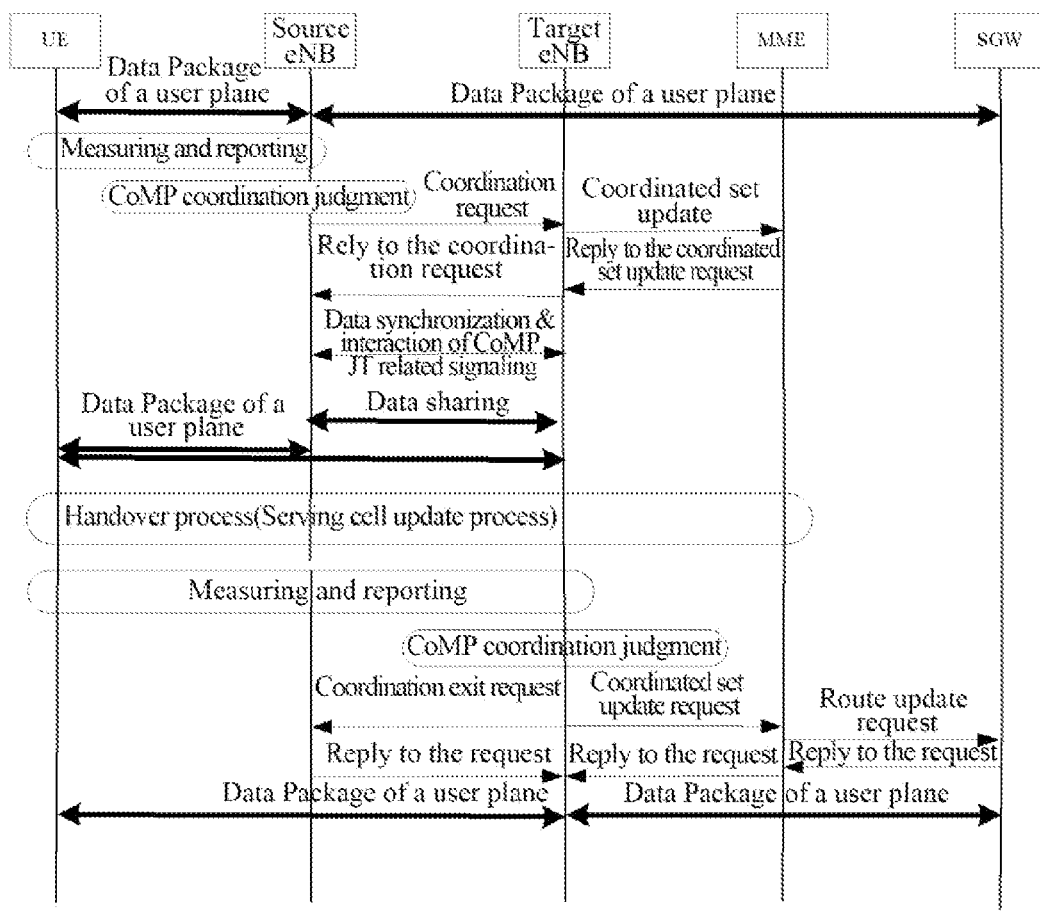
FIG. 4 is a signaling flowchart of triggering and exiting CoMP-JT according to an embodiment of the present document.
Figure 5:
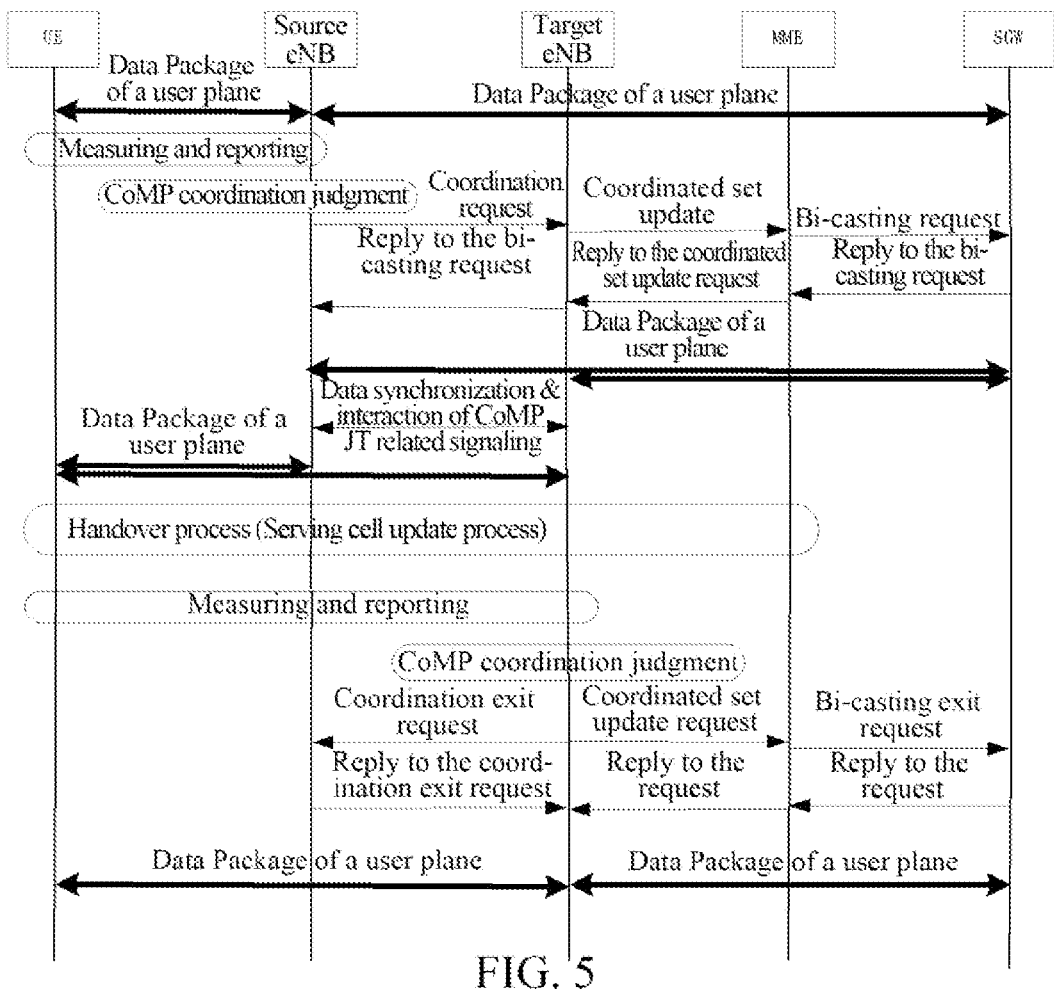
FIG. 5 is a signaling flowchart of triggering and exiting CoMP-JT and bi-casting according to an embodiment of the present document.

FIG. 3 is a signaling flowchart of triggering and exiting bi-casting according to an embodiment of the present document, FIG. 4 is a signaling flowchart of triggering and exiting CoMP-JT according to an embodiment of the present document, and FIG. 5 is a signaling flowchart of triggering and exiting CoMP-JT and bi-casting according to an embodiment of the present document. As shown in FIGS. 3, 4 and 5, the flow of triggering and exiting CoMP-JT and bi-casting according to an embodiment of the present document comprises the following processes.

In step 1, user equipment performs physical layer measurement in real time, and reports a measurement result to a RRC layer of a serving eNB, and the RRC layer analyzes and judges the measurement result. Wherein, the content of the physical layer measurement is RSRP or RSRQ.

In step 2, if signal quality of a target eNB is a certain threshold (T_add) higher than a signal of the serving eNB, the coordination is triggered. Wherein, a triggering threshold for CoMP-JT is larger than a triggering threshold for handover, thereby ensuring that the triggering for CoMP-JT is prior to the triggering for handover.

In step 3, the serving eNB initiates a coordination request to a target eNB, wherein the coordination request includes communication context information of the user equipment and coordination related resource scheduling information. The target eNB reserves corresponding resources and stores the communication context information, and at the same time, requests to update a coordinated set from the MME, wherein, the request message includes communication context information of the UE and coordination related information of the serving eNB and the target eNB. The MME stores two communication contexts of the UE, to ensure that the UE is kept in connection with the two eNBs at the same time in the coordination process.

In step 4, the MME receives a coordinated set update command, and triggers bi-casting to the SGW immediately. The SGW stores two communication routes (SGW to the serving eNB and the target eNB).

In step 5, the SGW transmits the same data to the serving eNB and the target eNB at the same time. The serving eNB and the target eNB buffer the data received from the SGW respectively, and at the same time, interacts necessary signaling messages required for CoMP-JT on the X2 interface, and performs a CoMP-JT process on the data and then transmits the data to the UE. Wherein, the necessary signaling messages required for CoMP-JT include data synchronization information, precoding information, CSI feedback, scheduling information etc.

In step 6, after the handover is completed, the original target eNB is converted into a serving eNB. The new serving eNB receives measurement report information from the user equipment, and when it is detected that the signal quality of the original serving eNB is lower than a certain threshold (T_free), the original serving eNB is required to exit the coordinated set, and MME is requested to update the coordinated set, and release bi-casting at the same time.

In step 7, after exiting CoMP-JT and bi-casting, the MME stores only the communication context of the new serving eNB, and after bi-casting is released, the SGW deletes the communication route to the original serving eNB.

Figure 6:
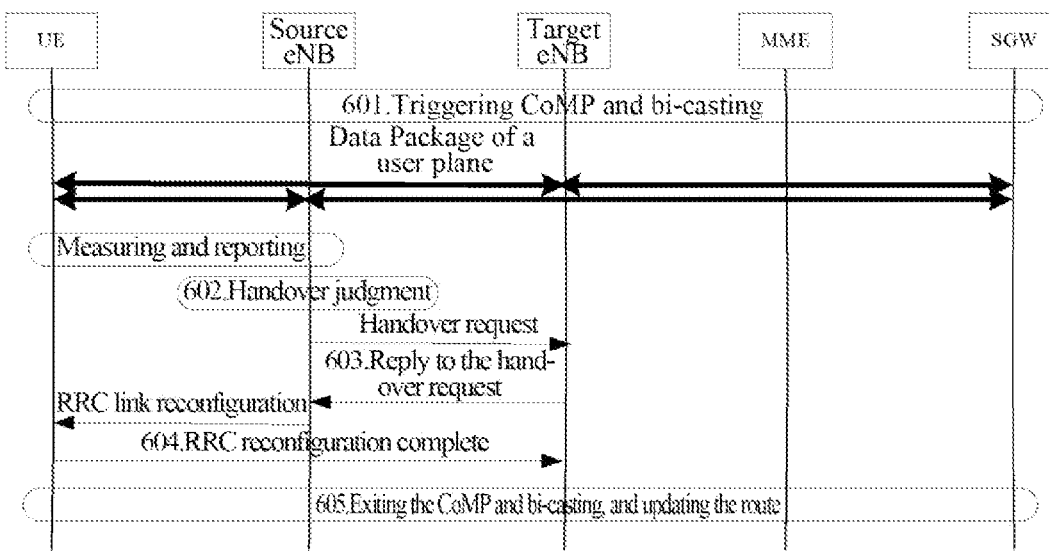
FIG. 6 is a signaling flowchart of base station handover (serving cell update) according to an embodiment of the present document.

FIG. 6 is a signaling flowchart of base station handover (serving cell update) according to an embodiment of the present document. As shown in FIG. 6, after the CoMP-JT and bi-casting technologies are used, the technical scheme according to the embodiment of the present document converts the handover process into a serving cell update process, which specifically comprises the following processes.

In step 601, the user equipment reports a measurement result of a physical layer in real time, and reports the result to a RRC layer of the serving eNB, and the RRC layer analyzes and judges the measurement result, wherein the content of the physical layer measurement is RSRP or RSRQ.

In step 602, if the signal quality of the target eNB is a certain threshold (T) higher than the signal of the serving eNB, handover is triggered. In order to reduce the ping-pong effect, a Time to Trigger (TTI) parameter is set, and only when the target eNB always meets the handover condition within the TTI, the handover will be triggered. The serving eNB transmits a handover request to a target eNB, to require updating the communication context information in the target eNB. After receiving the "handover request" and accepting the handover, the target eNB updates the communication context information stored locally, and transmits a "handover reply" to the serving eNB.

In step 603, after receiving the "handover reply" from the serving base station, the serving eNB updates the communication context information stored locally, and at the same time transmits "RRC link reconfiguration" signaling to the user equipment, to request to change the communication context information stored in the user equipment.

In step 604, after receiving the RRC connection reconfiguration information, the user equipment changes the local communication context information, to enable the target eNB to become a new serving eNB, and transmits RRC connection reconfiguration complete information to the new serving eNB, thereby completing the handover.

In step 605, as two sets of context information and routes are kept in the MME and SGW at the same time, the UE context update in the above two network element entities is processed in the process of exiting CoMP and bi-casting.

It should be illustrated that if the process of triggering CoMP and bi-casting fails, the handover process falls back to the standard LTE handover process. Although the embodiments of the present document merely describe the handover process based on the LTE network architecture, the present document is not limited to the embodiments described herein, and also includes various changes and variations made to these embodiments.

In conclusion, by means of the technical scheme of the embodiments of the present document, the CoMP-JT operation and the bi-casting operation are triggered before the base station handover, the UE is kept in connection with both the serving base station and the target base station at the same time using the CoMP-JT technology, data are transmitted by the SGW to the serving base station and the target base station at the same time using the bi-casting technology, and during the base station handover, the handover process is converted into the serving cell update process, which can reduce the complexity of the base station handover, increase the efficiency of the base station handover, and at the same time enhance practicability.

Apparatus Embodiments

Figure 7:
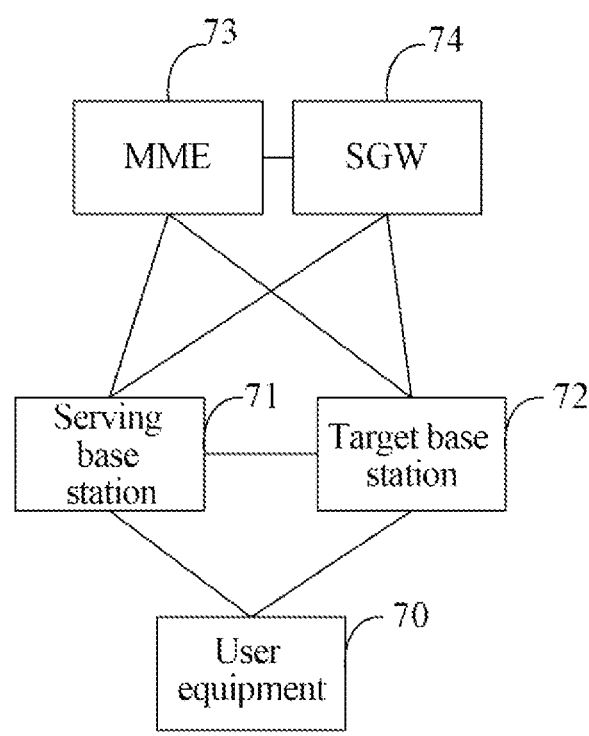
FIG. 7 is a structural diagram of a base station handover system for a communication system according to an embodiment of the present document.

According to the embodiment of the present document, a base station handover system for a communication system is provided. Based on the LTE network system architecture, FIG. 7 is a structural diagram of a base station handover system for a communication system according to an embodiment of the present document. As shown in FIG. 7, the base station handover system for a communication system according to an embodiment of the present document comprises user equipment 70, a serving base station 71, a target base station 72, a Mobility Management Entity (MME) 73, and a Serving GateWay (SGW) 74. Various modules according to the embodiment of the present document will be described in detail below.

The serving base station 71 is configured to trigger a bi-casting operation according to information reported by the user equipment 70, add a communication context of the target base station 72 into the MME 73, and interact with the user equipment 70 to hand over the user equipment 70 from the serving base station 71 to the target base station 72.

Specifically, the serving base station 71 is configured to hand over the user equipment 70 from the serving base station 71 to the target base station 72 by updating context information of the user equipment 70 when the user equipment 70 determines that it needs to perform base station handover, and release the bi-casting operation after the handover is completed.

The specific processes of triggering the bi-casting operation are as follows.

the user equipment 70 performs physical layer measurements in real time, and reports a measurement result to a Radio Resource Control protocol (RRC) layer of the serving base station 71.

The serving base station 71 analyzes the measurement result, and if a difference between signal quality of the target base station 72 and signal quality of the serving base station 71 is larger than a preset first threshold, triggers bi-casting to the SGW 7474.

The MME 73 is used to notify the SGW 74 to store two communication routes.

The SGW 74 is used to communicate with the serving base station 71 and the target base station 72 after the triggering of bi-casting is completed.

It should be illustrated that in the embodiment of the present document, the SGW 74 may communicate with the serving base station and the target base station at the same time. That is, the SGW 74 has a capability of communicating with the serving base station and the target base station at the same time. However, in practical applications, the SGW 74 may also not communicate with the serving base station and the target base station at the same time.

The SGW 74 is further configured to transmit the same data to the serving base station 71 and the target base station 72 at the same time in the downlink. The serving base station 71 and the target base station 72 are configured to transmit data transmitted by the SGW 74 through bi-casting to the user equipment 70 after receiving the data, and receive the data transmitted by the user equipment 70 in the uplink.

Preferably, in the embodiment of the present document, the CoMP operation may also be triggered. Wherein, the CoMP operation is a CoMP-Joint Transmission (JT) operation. Specifically, the serving base station 71 is further configured to trigger a CoMP operation before the bi-casting operation is triggered, and add context information of the user equipment 70 to the target base station 72 through an interface between base stations; after the triggering of CoMP is completed, after receiving data transmitted by the SGW 74 through bi-casting, transmit the data to the user equipment 70 on the same time-frequency resource through CoMP together with the target base station 72 in the downlink; and after the handover is completed and before the bi-casting operation is released, complete releasing the CoMP operation in coordination.

The target base station 72 is further configured to request the MME 73 to update a coordinated set, and add context information of the target base station 72 to the MME 73; after the triggering of CoMP is completed, after receiving data transmitted by the SGW 74 through bi-casting, transmit the data to the user equipment 70 on the same time-frequency resource through CoMP together with the serving base station 71 in the downlink; and after the handover is completed and before the bi-casting operation is released, complete releasing the CoMP operation in coordination.

The user equipment 70 is further configured to transmit the same information to the serving base station 71 and the target base station 72 respectively through CoMP at the same time.

The MME 73 is further configured to complete releasing the CoMP operation in coordination after the handover is completed and before the bi-casting operation is released; and the SGW 74 is further configured to release, after the handover is completed and before the bi-casting operation is released, the CoMP operation in coordination.

Specifically, triggering the CoMP operation and the bi-casting operation at the same time specifically comprises the following processes.

The user equipment 70 performs physical layer measurements in real time, and reports a measurement result to the serving base station 71.

The serving base station 71 analyzes the measurement result, and if a difference between signal quality of the target base station 72 and signal quality of the serving base station 71 is larger than a preset first threshold, initiates a CoMP-JT request to the target base station 72.

The target base station 72 reserves corresponding resources and stores corresponding context information of the user equipment 70, and transmits to the MME 73 a CoMP-JT coordinated set update request to request for triggering the CoMP-JT operation, wherein, the context information of the user equipment 70 stored by the target base station 72 is communication context information from the user equipment 70 to the target base station 72.

The MME 73 stores corresponding two sets of context information of the user equipment 70, and triggers bi-casting to the SGW 74, wherein, the two sets of context information of the user equipment 70 stored by the MME 73 is communication context information from the user equipment 70 to the target base station 72 and communication context information from the user equipment 70 to the serving base station 71.

The SGW 74 storing corresponding two sets of context information of the user equipment 70, wherein, the two sets of context information of the user equipment 70 stored by the SGW 74 comprises communication route information from the SGW 74 to the target base station 72 and communication route information from the SGW 74 to the serving base station 71.

The SGW 74 may be configured to perform bi-casting through interfaces between the base stations and the MME 73/SGW 74, and transmit the same data to the serving base station 71 and the target base station 72 at the same time; and the serving base station 71 and the target base station 72 are configured to buffer the data respectively, interact signaling messages necessarily required for the CoMP-JT operation on an interface between the base stations, and after the CoMP-JT process is performed on the data according to the signaling message, transmit the data to the user equipment 70 on the same time-frequency resource through the CoMP-JT. The serving base station 71 and the target base station 72 are configured to interact, after the data are buffered, information through the interface between the base stations, select a received signal of a base station with better quality as a reception signal, and discard a signal of a base station with worse quality.

Handing over the user equipment 70 specifically comprises the following processes.

The serving base station 71 analyzes a measurement result reported by the user equipment 70, and if a difference between signal quality of the target base station 72 and signal quality of the serving base station 71 is larger than a preset second threshold, determines to perform base station handover; transmits a handover request to the target base station 72, and transmits RRC link reconfiguration information to the user equipment 70, wherein, the second threshold is larger than the first threshold; the target base station 72 updates the context information of the user equipment 70 according to the handover request; the user equipment 70 transmits RRC link reconfiguration complete information to the target base station 72, to complete handover from the serving base station to the target base station 72.

Exiting the CoMP operation and the bi-casting operation specifically comprises:

a new serving base station (original target base station) 71 of the user equipment 70 analyzing a measurement result reported by the user equipment 70, and when it is determined that the signal quality of the original serving base station 71 is lower than a preset third threshold, transmitting to the MME 73 a CoMP-JT coordinated set update request to request for releasing the CoMP-JT operation, and transmitting a CoMP-JT coordination exit request to the original serving base station 71;

the original serving base station 71 deleting the communication context information from the user equipment 70 to the original serving base station 71, and transmitting a response to the CoMP-JT coordination exit request to the new serving base station 71;

the MME 73 exiting the CoMP-JT operation, storing only the communication context information from the user equipment 70 to the new serving base station 71, and transmitting a bi-casting exit request to the SGW 74; and the SGW 74 exiting the bi-casting operation, storing only the communication route information from the SGW 74 to the new serving base station 71, and transmitting a response to the bi-casting exit request to the MME 73.

The technical scheme of the embodiments of the present document will be described in detail below by taking triggering the CoMP operation and the bi-casting operation at the same time as an example.

The user equipment 70 is specifically configured to determine whether it needs to perform base station handover, and trigger the CoMP-JT operation and the bi-casting operation in coordination with the serving base station 71, the target base station 72, the MME 73, and the SGW 74, release the CoMP-JT operation and the bi-casting operation after the handover is completed, and be handed over from the serving base station to the target base station 72 in coordination with the serving base station 71, the target base station 72, the MME 73, and the SGW 74 by updating the context information of the user equipment 70.

The serving base station 71, the target base station 72, the MME 73, and the SGW 74 are specifically configured to, before the user equipment 70 determines that it needs to perform base station handover, trigger the CoMP-JT operation and the bi-casting operation in coordination with the user equipment 70, and after the handover is completed, release the CoMP-JT operation and the bi-casting operation as needed; when the user equipment 70 determines that it needs to perform base station handover, hand over the vehicle-mounted base station from the serving base station to the target base station 72 in coordination with the user equipment 70 by updating the context information of the user equipment 70.

Wherein, when the user equipment 70 triggers the CoMP-JT operation and the bi-casting operation in coordination with the serving base station 71, the target base station 72, the MME 73, and the SGW 74, the user equipment 70 is specifically configured to measure a physical layer in real time, and report a measurement result to a Radio Resource Control protocol (RRC) layer of the serving base station 71. The serving base station 71 is specifically configured to analyze the measurement result, and if a difference between signal quality of the target base station 72 and signal quality of the serving base station 71 is larger than a preset first threshold, initiate a CoMP-JT request to the target base station 72. The target base station 72 is specifically configured to reserve corresponding resources and store corresponding context information of the user equipment 70, and transmit to the MME 73 a CoMP-JT coordinated set update request to request for triggering the CoMP-JT operation, wherein, the context information of the user equipment 70 stored by the target base station 72 is communication context information from the user equipment 70 to the target base station 72. The MME 73 is specifically configured to store corresponding two sets of context information of the user equipment 70, and trigger bi-casting to the SGW 74, wherein, the two sets of context information of the user equipment 70 stored by the MME 73 is communication context information from the user equipment 70 to the target base station 72 and communication context information from the user equipment 70 to the serving base station 71. The SGW 74 is specifically configured to store corresponding two sets of context information of the user equipment 70, wherein, the two sets of context information of the user equipment 70 stored by the SGW 74 comprises communication route information from the SGW 74 to the target base station 72 and communication route information from the SGW 74 to the serving base station 71. Preferably, the SGW 74 may be configured to perform bi-casting through interfaces (for example, the S1 interface) between the base stations and the MME/SGW, and transmit the same data to the serving base station 71 and the target base station 72 at the same time.

Wherein, when the user equipment 70 is handed over from the serving base station to the target base station 72 in coordination with the serving base station 71, the target base station 72, the MME 73 an the SGW 74 by updating the context information of the user equipment 70, the serving base station 71 is specifically configured to analyze a measurement result reported by the user equipment 70, and if a difference between signal quality of the target base station 72 and signal quality of the serving base station 71 is larger than a preset second threshold, determine to perform base station handover, transmit a handover request to the target base station 72, and transmit RRC link reconfiguration information to the user equipment 70, wherein, the second threshold is larger than the first threshold; the target base station 72 is specifically configured to update the context information of the user equipment 70 according to the handover request; and the user equipment 70 is specifically configured to transmit RRC link reconfiguration complete information to the target base station 72, to complete handover from the serving base station to the target base station 72.

Wherein, when it needs to release CoMP-JT and bi-casting, the new serving base station is specifically configured to analyze a measurement result reported by the user equipment 70, and when it is determined that the signal quality of the original serving base station is lower than a preset third threshold, transmit to the MME 73 a CoMP-JT coordinated set update request to request for releasing the CoMP-JT operation, and transmit a CoMP-JT coordination exit request to the original serving base station; the original serving base station is specifically configured to delete the communication context information from the user equipment 70 to the original serving base station, and transmit a response to the CoMP-JT coordination exit request to the new serving base station; the MME 73 is specifically configured to exit the CoMP-JT operation, store only the communication context information from the user equipment 70 to the new serving base station, and transmit a bi-casting exit request to the SGW 74; and the SGW 74 is specifically configured to exit the bi-casting operation, store only the communication route information from the SGW 74 to the new serving base station, and transmit a response to the bi-casting exit request to the MME 73.

The serving base station 71 and the target base station 72 are further configured to, after the CoMP-JT operation and the bi-casting operation are triggered, in the downlink, after receiving the data transmitted by the SGW 74 through bi-casting, transmit the data to the user equipment 70 on the same time-frequency resources through CoMP-JT, and in the uplink, receive the signal transmitted by the user equipment 70 at the same time, and perform selective combining by information interaction.

Specifically, in the downlink, the serving base station 71 and the target base station 72 may buffer the data transmitted by the SGW 74 respectively, interact signaling messages necessarily required for the CoMP-JT operation on an interface (for example, the X2 interface) between base stations, and after the CoMP-JT process is performed on the data according to the signaling message, transmit the data to the user equipment 70 on the same time-frequency resources through CoMP-JT. In the uplink, the serving base station 71 and the target base station 72 may interact information through the interface (for example, the X2 interface) between base stations, select a received signal of a base station with better quality as a reception signal, and discard a signal of a base station with worse quality.

The user equipment 70 is further configured to combine the data received from the serving base station 71 and the target base station 72.

It should be illustrated that, the embodiment of the present document is applicable to band wireless communication topology environment, and is also applicable to multiple CoMP-JT standard scenarios.

The above technical scheme of the embodiments of the present document will be described in detail below in conjunction with accompanying drawings.

Based on the system network architecture illustrated in FIG. 1, CoMP-JT and bi-casting technologies are used in the embodiments of the present document to improve the handover performance, which specifically comprises the following processes.

First: seamless handover is achieved on the air interface using CoMP-JT. Specifically, 1. With respect to the downlink, the serving eNB and the target eNB transmit the same data to the user equipment on the same time-frequency resource, and the user equipment combines the received signals to achieve the diversity effect, thereby improving the quality of the received signal. With respect to the uplink, the serving eNB and the target eNB receive the signal transmitted by the user equipment at the same time, and perform selective combining by information interaction through the X2 interface (i.e., selecting a received eNB signal with better quality as a reception signal, and discard an eNB reception signal with poor quality).

2. The train keeps communication with the serving eNB and the target eNB at the same time, and there is no "break-before-make" process in the handover process, to achieve an effect of soft handover.

3. The air interface handover process is converted into a serving cell update process, which is achieved by changing communication context information in various network element entities. Wherein, after the target eNB receives a "handover request" message and accepts the handover, the target eNB updates communication context information which is stored locally; after receiving a "handover reply" from the target eNB, the serving eNB updates the communication context information stored locally; the user equipment changes the communication context information stored locally by receiving "RRC link reconfiguration" signaling transmitted by the serving eNB; and the change of the communication context information stored in the MME/SGW is completed after exiting the coordination and bi-casting.

4. The information necessarily required for the CoMP-JT process is interacted through the X2 interface. Wherein, the necessary information required for the CoMP-JT process includes data synchronization information, precoding information, CSI feedback, scheduling information etc.

Second: handover delay is reduced on the S1 interface through bi-casting. Specifically, 1. With respect to the downlink, the SGW transmits the same data to two eNBs at the same time, thereby reducing interruption time generated by "data forwarding" in the LTE handover. With respect to the uplink, bi-casting of data is not performed at the same time, but the serving eNB and the target eNB perform selective combining and transmission of a single path using a bi-casting link.

2. Corresponding soft upgrade processing is performed on the MME, so that after the MME receives a "CoMP-JT coordinated set update" message from the eNB, the MME can directly trigger bi-casting to the SGW, and obtain two communication routes by using communication context information of the serving eNB and the target eNB in the "CoMP-JT coordinated set update" message.

3. The triggering and exiting of CoMP-JT and bi-casting occur at the same time, without adding extra complexity of the system.

FIG. 3 is a signaling flowchart of triggering and exiting CoMP-JT and bi-casting according to an embodiment of the present document. As shown in FIG. 3, the flow of triggering and exiting CoMP-JT and bi-casting according to an embodiment of the present document comprises the following processes.

In step 1, user equipment performs physical layer measurement in real time, and reports a measurement result to a RRC layer of a serving eNB, and the RRC layer analyzes and judges the measurement result. Wherein, the content of the physical layer measurement is RSRP or RSRQ.

In step 2, if signal quality of a target eNB is a certain threshold (T_add) higher than a signal of the serving eNB, the coordination is triggered. Wherein, a triggering threshold for CoMP-JT is larger than a triggering threshold for handover, thereby ensuring that the triggering for CoMP-JT is prior to the triggering for handover.

In step 3, the serving eNB initiates a coordination request to a target eNB, wherein the coordination request includes communication context information of the user equipment and coordination related resource scheduling information. The target eNB reserves corresponding resources and stores the communication context information, and at the same time, requests to update a coordinated set from the MME, wherein, the request message includes communication context information of the UE and coordination related information of the serving eNB and the target eNB. The MME stores two communication contexts of the UE, to ensure that the UE is kept in connection with the two eNBs at the same time in the coordination process.

In step 4, the MME receives a coordinated set update command, and triggers bi-casting to the SGW immediately.

The SGW stores two communication routes (SGW to the serving eNB and the target eNB).

In step 5, the SGW transmits the same data to the serving eNB and the target eNB at the same time. The serving eNB and the target eNB buffer the data received from the SGW respectively, and at the same time, interacts necessary signaling message required for CoMP-JT on the X2 interface, and performs a CoMP-JT process on the data and then transmits the data to the UE. Wherein, the necessary signaling message required for CoMP-JT includes data synchronization information, precoding information, CSI feedback, scheduling information etc.

In step 6, after the handover is completed, the original target eNB is converted into a serving eNB. The new serving eNB receives measurement report information from the user equipment, and when it is detected that the signal quality of the original serving eNB is lower than a certain threshold (T_free), the original serving eNB is required to exit the coordinated set, and MME is requested to update the coordinated set, and release bi-casting at the same time.

In step 7, after exiting CoMP-JT and bi-casting, the MME stores only the communication context of the new serving eNB, and after bi-casting is released, the SGW deletes the communication route to the original serving eNB.

FIG. 4 is a signaling flowchart of base station handover (serving cell update) according to an embodiment of the present document. As shown in FIG. 4, after the CoMP-JT and bi-casting technologies are used, the technical scheme according to the embodiment of the present document converts the handover process into a serving cell update process, which specifically comprises the following processes.

In step one, the user equipment reports a measurement result of a physical layer in real time, and reports the result to a RRC layer of the serving eNB, and the RRC layer analyzes and judges the measurement result, wherein the content of the physical layer measurement is RSRP or RSRQ.

In step two, if the signal quality of the target eNB is a certain threshold (T) higher than the signal of the serving eNB, handover is triggered. In order to reduce the ping-pong effect, a Time to Trigger (TTI) parameter is set, and only when the target eNB always meets the handover condition within the TTI, the handover will be triggered. The serving eNB transmits a handover request to a target eNB, to require updating the communication context information in the target eNB. After receiving the "handover request" and accepting the handover, the target eNB updates the communication context information stored locally, and transmits a "handover reply" to the serving eNB.

In step three, after receiving the "handover reply" from the serving base station, the serving eNB updates the communication context information stored locally, and at the same time transmits "RRC link reconfiguration" signaling to the user equipment, to request to change the communication context information stored in the user equipment.

In step four, after receiving the RRC connection reconfiguration information, the user equipment changes the local communication context information, to enable the target eNB to become a new serving eNB, and transmits RRC connection reconfiguration complete information to the new serving eNB, thereby completing the handover.

In step five, as two sets of context information and routes are kept in the MME and SGW at the same time, the UE context update in the above two network element entities is processed in the process of exiting CoMP and bi-casting.

It should be illustrated that if the process of triggering CoMP and bi-casting fails, the handover process falls back to the standard LTE handover process. Although the embodiments of the present document merely describe the handover process based on the LTE network architecture, the present document is not limited to the embodiments described herein, and also includes various changes and variations made to these embodiments.

It should be illustrated that the system according to the embodiments of the present document allows CoMP-JT and bi-casting to be used independently at the same time.

In conclusion, by means of the technical scheme of the embodiments of the present document, the CoMP-JT operation and the bi-casting operation are triggered before the base station handover, the UE is kept in connection with both the serving base station and the target base station at the same time using the CoMP-JT technology, data are transmitted by the SGW to the serving base station and the target base station at the same time using the bi-casting technology, and during the base station handover, the handover process is converted into the serving cell update process, which can reduce the complexity of the base station handover, enhance the efficiency of the base station handover, and at the same time enhance practicability.

The algorithms and displays provided herein are not inherently related to any particular computer, virtual system or other devices. Various general-purpose systems may also be used together based on the teaching herein. According to the above description, the structure required for constructing such system is obvious. In addition, the present document is not limited to any particular programming language. It should be understood that the content of the present document described herein may be achieved by using various programming languages, and the above description of the particular language is to disclose an optimal implementation of the present document.

A number of specific details are described in the specification provided herein. However, it can be understood that the embodiments of the present document can be practiced without these specific details. In some examples, well-known methods, structures and technologies are not described in detail, so as not to obscure the understanding of the present specification.

INDUSTRIAL APPLICABILITY

The embodiments of the present document have the following beneficial effects:

The CoMP-JT operation and the bi-casting operation are triggered before the base station handover, the UE is kept in connection with both the serving base station and the target base station at the same time using the CoMP-JT technology, data are transmitted by the SGW to the serving base station and the target base station at the same time by using the bi-casting technology, and during the base station handover, the handover process is converted into the serving cell update process, which can reduce the complexity of the base station handover, increase the efficiency of the base station handover, and at the same time enhance practicability.

What is claimed is:

1. A base station handover method for a communication system of a long term evolution network, comprising:
    a serving base station triggering a Coordinated Multi-Point, CoMP, operation according to information reported by a user equipment, and the serving base station adding context information of the user equipment to a target base station through an interface between base stations;

the target base station requesting a Mobility Management Entity, MME, to update a coordinated set, and adding context information of the target base station into the MME;

the MME triggering a bi-casting operation to a Serving GateWay, SGW, and notifying the SGW to store two communication routes;

the SGW communicating with the serving base station and the target base station after the triggering of the CoMP operation and the bi-casting operation are completed; and the serving base station interacting with the user equipment, to hand over the user equipment from the serving base station to the target base station.

2. The method according to claim 1, wherein, the serving base station interacting with the user equipment, to hand over the user equipment from the serving base station to the target base station comprises:

when it is determined that it needs to perform base station handover, handing over the user equipment from the serving base station to the target base station by updating the context information of the user equipment; and after the handover is completed, the method further comprises: releasing the bi-casting operation.

3. The method according to claim 1, after the SGW communicates with the serving base station and the target base station, the method further comprising:

in a downlink, after receiving data transmitted by the SGW through bi-casting, the serving base station and the target base station transmitting the data to the user equipment on a same time-frequency resource through CoMP; and in an uplink, the serving base station and the target base station receiving the data of the user equipment in coordination; and after the handover is completed and before the bi-casting operation is released, releasing the CoMP operation.

4. The method according to claim 3, wherein, the CoMP operation is a CoMP-Joint Transmission (JT) operation.

5. The method according to claim 4, wherein, triggering the CoMP operation and the bi-casting operation comprises:

the user equipment performing physical layer measurements in real time, and reporting a measurement result to a RRC layer of the serving base station;

the RRC layer of the serving base station analyzing the measurement result, and if a difference between signal quality of the target base station and signal quality of the serving base station is larger than a preset first threshold, initiating a CoMP-JT request to the target base station;

the target base station reserving corresponding resources and storing corresponding context information of the user equipment, and transmitting to the MME a CoMP-JT coordinated set update request to request for triggering the CoMP-JT operation, wherein, the context information of the user equipment stored by the target base station is communication context information from the user equipment to the target base station;

the MME storing corresponding two sets of context information of the user equipment, and triggering bi-casting to the SGW, wherein, the two sets of context information of the user equipment stored by the MME are communication context information from the user equipment to the target base station and communication context information from the user equipment to the serving base station; and the SGW storing corresponding two sets of context information of the user equipment, wherein, the two sets of context information of the user equipment stored by the SGW comprise communication route information from the SGW to the target base station and communication route information from the SGW to the serving base station.

6. The method according to claim 5, wherein, after receiving data transmitted by the SGW through bi-casting, the serving base station and the target base station transmitting the data to the user equipment on the same time-frequency resource through CoMP-JT comprises:

the SGW performing bi-casting through interfaces between base stations and a MME/SGW, and transmitting same data to the serving base station and the target base station at the same time; and the serving base station and the target base station buffering the data respectively, interacting signaling messages necessarily required for the CoMP-JT operation on an interface between the base stations, and after the CoMP-JT process is performed on the data according to the signaling messages, transmitting the data to the user equipment on a same time-frequency resource through CoMP-JT;

wherein, after the serving base station and the target base station buffer the data respectively, the method further comprises:

the serving base station and the target base station interacting information through the interface between the base stations, selecting a received signal of a base station with better quality as a reception signal, and discarding a signal of a base station with worse quality.

7. The method according to claim 5, wherein, handing over the user equipment from the serving base station to the target base station comprises:

the RRC layer of the serving base station analyzing a measurement result reported by the user equipment, and if a difference between signal quality of the target base station and signal quality of the serving base station is larger than a preset second threshold, determining to perform base station handover, wherein, the second threshold is larger than the first threshold;

the serving base station transmitting a handover request to the target base station;

the target base station updating the context information of the user equipment according to the handover request;

the serving base station transmitting RRC link reconfiguration information to the user equipment; and the user equipment transmitting RRC link reconfiguration complete information to the target base station, to complete handover from the serving base station to the target base station.

8. The method according to claim 3, wherein, after the handover is completed and before the bi-casting operation is released, releasing the CoMP operation comprises:

a RRC layer of a new serving base station of the user equipment analyzing a measurement result reported by the user equipment, and when it is determined that the signal quality of the original serving base station is lower than a preset third threshold, transmitting to the MME a CoMP-JT coordinated set update request to request for releasing the CoMP-JT operation, and transmitting a CoMP-JT coordination exit request to the original serving base station;

the original serving base station deleting the communication context information from the user equipment to the original serving base station, and transmitting a response to the CoMP-JT coordination exit request to the new serving base station;

the MME exiting the CoMP-JT operation, storing only the communication context information from the user equipment to the new serving base station, and transmitting a bi-casting exit request to the SGW; and the SGW exiting the bi-casting operation, storing only communication route information from the SGW to the new serving base station, and transmitting a response to the bi-casting exit request to the MME.

9. A base station handover system for a communication system of a long term evolution network, comprising: a user equipment, a serving base station, a target base station, a Mobility Management Entity (MME), and a Serving Gate-Way (SGW), wherein, the serving base station is configured to trigger a Coordinated Multi-Point, CoMP, operation according to information reported by the user equipment, and add context information of the user equipment to the target base station through an interface between base stations;

the target base station is configured to request the MME to update a coordinated set, and add context information of the target base station into the MME;

the MME is configured to trigger a bi-casting operation to the SGW, and notify the SGW to store two communication routes;

the SGW is configured to communicate with the serving base station and the target base station after the triggering of the CoMP operation and the bi-casting operation are completed; and the serving base station is further configured to interact with the user equipment to hand over the user equipment from the serving base station to the target base station.

10. The system according to claim 9, wherein, the serving base station is configured to hand over the user equipment from the serving base station to the target base station by updating the context information of the user equipment when it is determined that it needs to perform base station handover, and release the bi-casting operation after the handover is completed.

11. The system according to claim 9, wherein, the serving base station is configured to, in a downlink, after receiving data transmitted by the SGW through bi-casting, transmit the data to the user equipment on a same time-frequency resource through CoMP together with the target base station; and after the handover is completed and before the bi-casting operation is released, complete releasing the CoMP operation in coordination;

the target base station is configured to, in the downlink, after receiving data transmitted by the SGW through bi-casting, transmit the data to the user equipment on the same time-frequency resource through CoMP together with the serving base station; and after the handover is completed and before the bi-casting operation is released, complete releasing the CoMP operation in coordination;

the user equipment is configured to transmit same information to the serving base station and the target base station respectively through CoMP at the same time;

the MME is configured to, after the handover is completed and before the bi-casting operation is released, complete releasing the CoMP operation in coordination; and the SGW is configured to, after the handover is completed and before the bi-casting operation is released, release the CoMP operation in coordination.

12. The system according to claim 11, wherein, the CoMP operation is a CoMP-Joint Transmission (JT) operation.

13. The system according to claim 12, wherein, the user equipment is configured to measure a physical layer in real time, and report a measurement result to the serving base station;

the serving base station is configured to analyze the measurement result, and if a difference between signal quality of the target base station and signal quality of the serving base station is larger than a preset first threshold, initiate a CoMP-JT request to the target base station;

the target base station is configured to reserve corresponding resources and store corresponding context information of the user equipment, and transmit to the MME a CoMP-JT coordinated set update request to request for triggering the CoMP-JT operation, wherein, the context information of the user equipment stored by the target base station is communication context information from the user equipment to the target base station;

the MME is configured to store corresponding two sets of context information of the user equipment, and trigger bi-casting to the SGW, wherein, the two sets of context information of the user equipment stored by the MME are communication context information from the user equipment to the target base station and communication context information from the user equipment to the serving base station; and the SGW is configured to store corresponding two sets of context information of the user equipment, wherein, the two sets of context information of the user equipment stored by the SGW comprise communication route information from the SGW to the target base station and communication route information from the SGW to the serving base station.

14. The system according to claim 13, wherein, the SGW is configured to perform bi-casting through interfaces between base stations and a MME/SGW, and transmit same data to the serving base station and the target base station at the same time; and the serving base station and the target base station are configured to buffer the data respectively, interact signaling messages necessarily required for the CoMP-JT operation on an interface between base stations, and after the CoMP-JT operation is performed on the data according to the signaling messages, transmit the data to the user equipment on a same time-frequency resource through the CoMP-JT;

wherein the serving base station and the target base station are configured to, after the data are buffered, interact information through an interface between base stations, select a received signal of a base station with better quality as a reception signal, and discard a signal of a base station with worse quality.

15. The system according to claim 13, wherein, the serving base station is configured to analyze a measurement result reported by the user equipment, and if a difference between signal quality of the target base station and signal quality of the serving base station is larger than a preset second threshold, determine to perform base station handover, transmit a handover request to the target base station, and transmit RRC link reconfiguration information to the user equipment, wherein, the second threshold is larger than the first threshold;

the target base station is configured to update the context information of the user equipment according to the handover request; and the user equipment is configured to transmit RRC link reconfiguration complete information to the target base station, to complete handover from the serving base station to the target base station.

16. The system according to claim 11, wherein, a new serving base station of the user equipment is configured to analyze a measurement result reported by the user equipment, and when it is determined that the signal quality of an original serving base station is lower than a preset third threshold, transmit to the MME a CoMP-JT coordinated set update request to request for releasing the CoMP-JT operation, and transmit a CoMP-JT coordination exit request to the original serving base station;

the original serving base station is configured to delete the communication context information from the user equipment to the original serving base station, and transmit a response to the CoMP-JT coordination exit request to the new serving base station;

the MME is configured to exit the CoMP-JT operation, store only the communication context information from the user equipment to the new serving base station, and transmit a bi-casting exit request to the SGW; and the SGW is configured to exit the bi-casting operation, store only the communication route information from the SGW to the new serving base station, and transmit a response to the bi-casting exit request to the MME.

\* \* \* \* \*